United States Patent
Esslinger et al.

(10) Patent No.: US 11,166,594 B2
(45) Date of Patent: Nov. 9, 2021

(54) ELECTRIC MOTOR OPERATED KITCHEN APPLIANCE AS WELL AS STIRRING VESSEL AND STIRRER THEREFOR

(71) Applicant: Vorwerk & Co. Interholding GmbH, Wuppertal (DE)

(72) Inventors: Michael Esslinger, Rottweil (DE); Daniel Zuber, Wuppertal (DE); Patrick Scholder, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 281 days.

(21) Appl. No.: 16/156,145

(22) Filed: Oct. 10, 2018

(65) Prior Publication Data
US 2019/0104889 A1    Apr. 11, 2019

(30) Foreign Application Priority Data
Oct. 11, 2017   (DE) .................... 10 2017 123 690.2

(51) Int. Cl.
  *B22C 5/00*   (2006.01)
  *A47J 43/07*  (2006.01)
  *A47J 43/046* (2006.01)

(52) U.S. Cl.
  CPC ......... *A47J 43/0716* (2013.01); *A47J 43/046* (2013.01)

(58) Field of Classification Search
  CPC combination set(s) only.
  See application file for complete search history.

(56) References Cited

U.S. PATENT DOCUMENTS

| 7,387,269 B2 * | 6/2008 | Mally ................... A47J 43/085 241/282.1 |
| 2014/0247686 A1 * | 9/2014 | Arnett ................. A47J 43/0761 366/205 |
| 2017/0295999 A1 * | 10/2017 | Hensel .................... A47J 43/00 |

FOREIGN PATENT DOCUMENTS

| CN | 102334925 A * | 2/2012 | ............... F16D 3/06 |
| DE | 10 2010 016 667 A1 | 11/2011 | |
| EP | 2875762 A1 * | 5/2015 | .......... A47J 43/0716 |
| EP | 2 875 762 B1 | 3/2016 | |
| EP | 2875762 B1 * | 3/2016 | ............ A47J 43/046 |

OTHER PUBLICATIONS

"Carsten, Jacobs 'Kitchen Appliance operated by electric motor', Feb. 1, 2012" Documented Labeled: "CN102334925A_desc_eng" (Year: 2012).*

* cited by examiner

*Primary Examiner* — Anshu Bhatia
*Assistant Examiner* — Gregory Y Huan
(74) *Attorney, Agent, or Firm* — Collard & Roe, P.C.

(57) ABSTRACT

A stirrer for inserting into a bottom opening of a vessel bottom of a stirring vessel of an electric motor operated kitchen appliance has a plurality of positioning protrusions embodied on its circumferential surface one behind the other in the circumferential direction. A plurality of first positioning protrusions of the circumferential surface protrude with a first radial length difference beyond a smallest radius of the circumferential surface. At least one second positioning protrusion protrudes with a second radial length difference beyond the smallest radius of the circumferential surface, which second radial length difference is smaller than the first radial length difference.

7 Claims, 5 Drawing Sheets

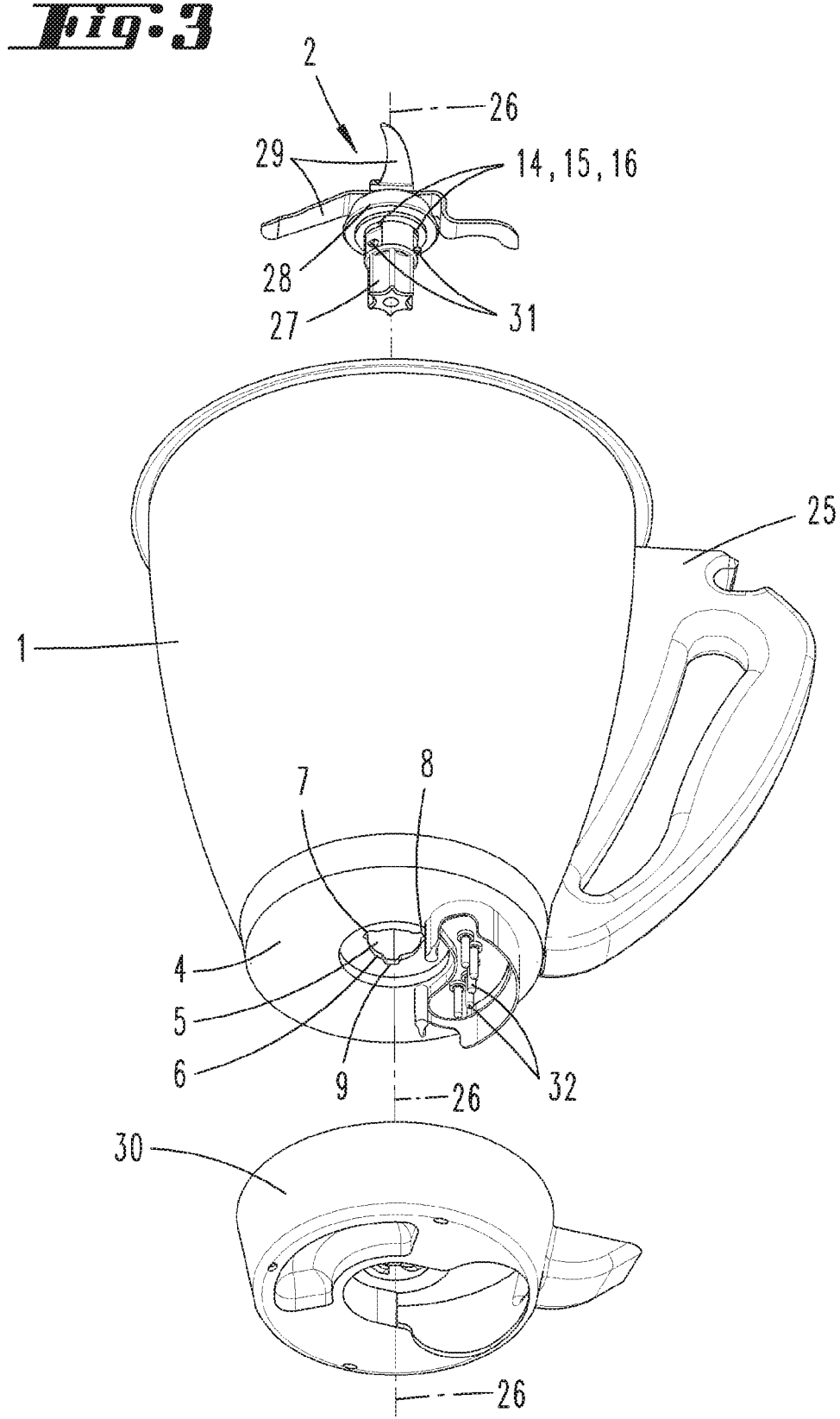

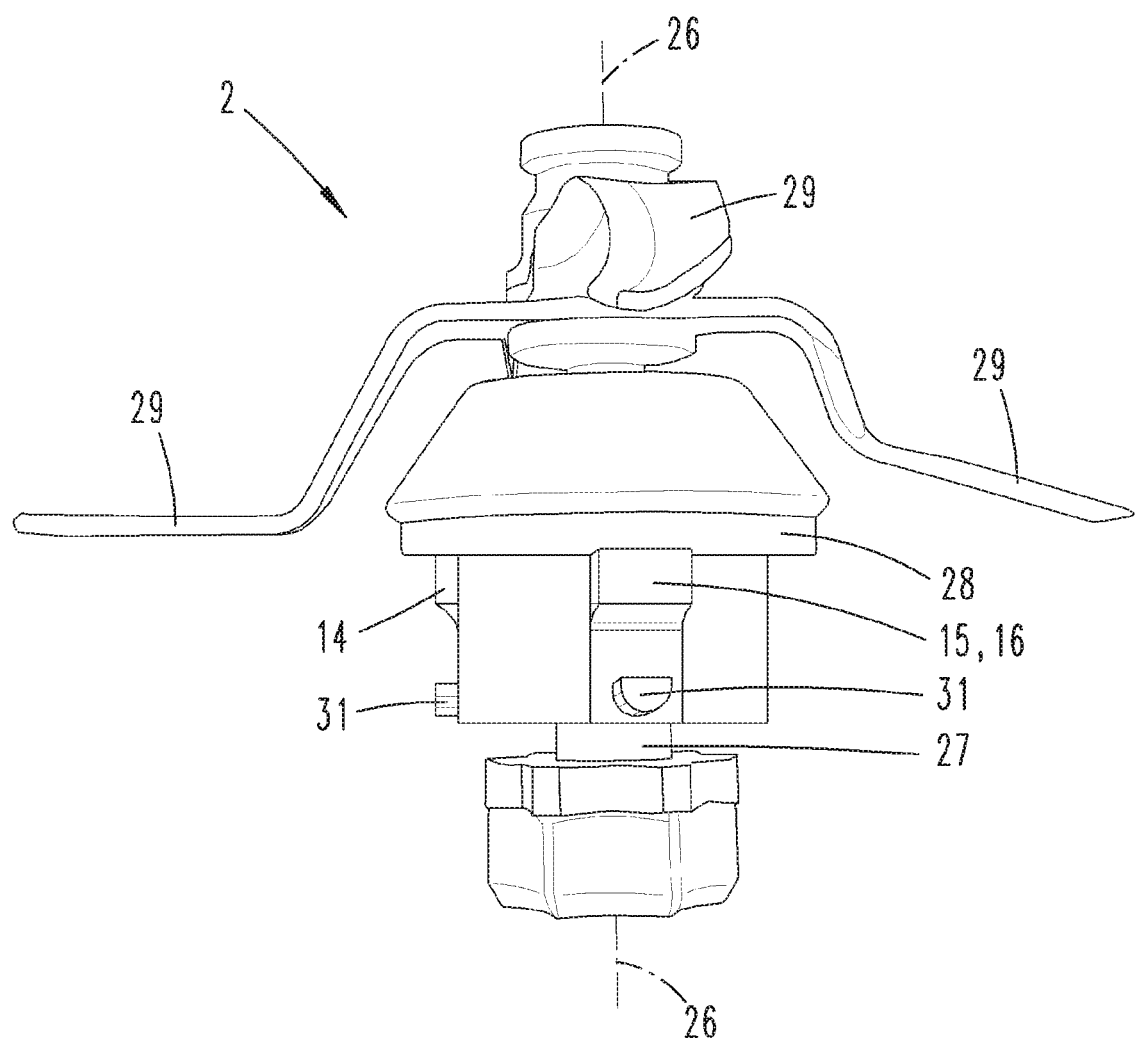

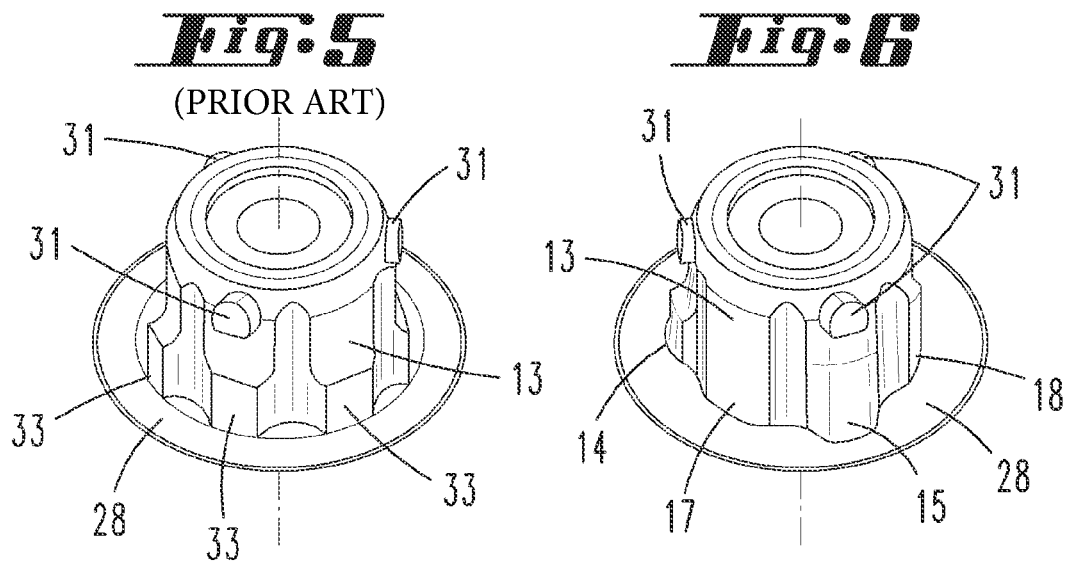
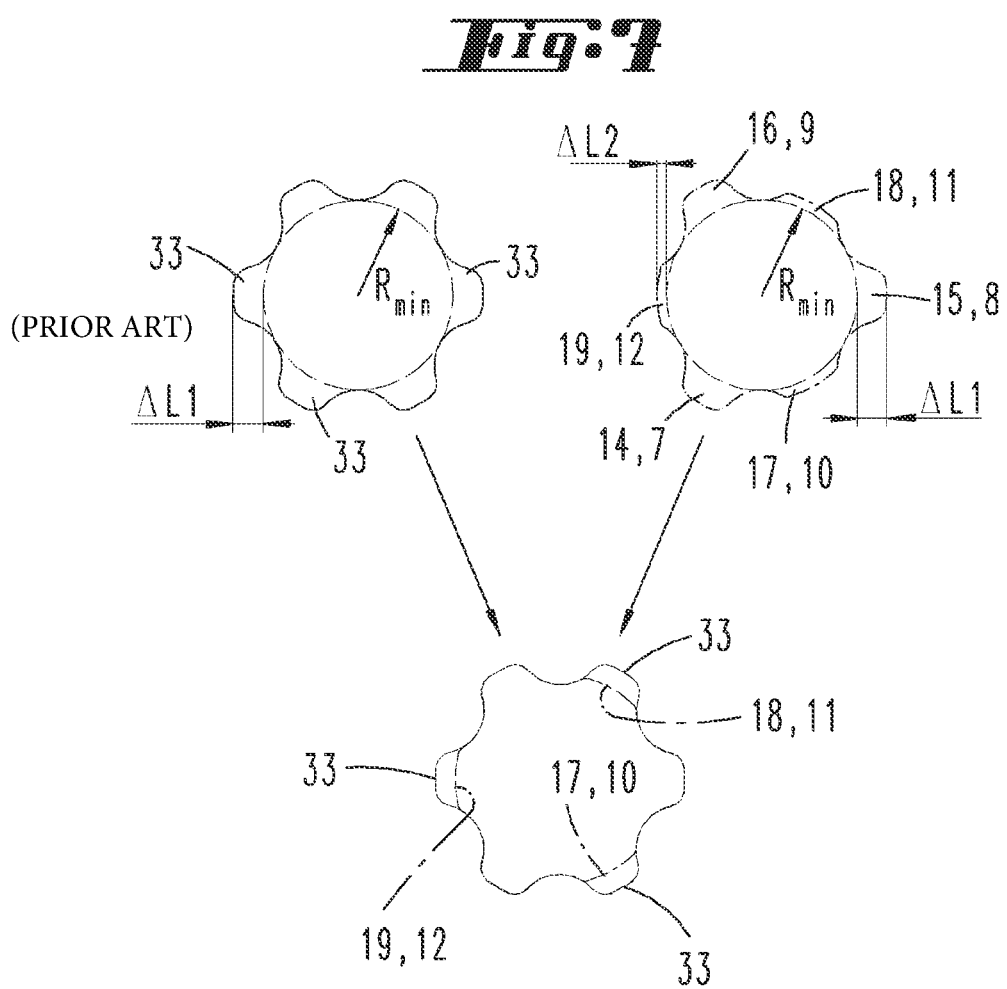

ELECTRIC MOTOR OPERATED KITCHEN APPLIANCE AS WELL AS STIRRING VESSEL AND STIRRER THEREFOR

CROSS REFERENCE TO RELATED APPLICATIONS

Applicant claims priority under 35 U.S.C. § 119 of German Application No. 10 2017 123 690.2 filed on Oct. 11, 2017, the disclosure of which is incorporated by reference.

BACKGROUND OF THE INVENTION

1. Field of the Invention

The invention initially relates to a stirring vessel for an electric motor operated kitchen appliance, comprising a vessel bottom, which has a bottom opening for accommodating a stirrer, which can protrude through the vessel bottom into the stirring vessel, wherein an opening contour of the bottom opening has a plurality of positioning recesses embodied one behind the other in the circumferential direction.

The invention furthermore relates to a stirrer for inserting into a bottom opening of a vessel bottom of a stirring vessel of an electric motor operated kitchen appliance, wherein the stirrer has a plurality of positioning protrusions embodied on its circumferential surface one behind the other in the circumferential direction.

The invention furthermore relates to a stirring vessel comprising a stirrer as well as an electric motor operated kitchen appliance comprising a base unit, a stirring vessel, which can be connected to the base unit, and a stirrer, which can be inserted into a bottom opening of a vessel bottom of the stirring vessel.

2. Description of the Related Art

Electric motor operated kitchen appliances as well as stirring vessels and stirrers for them are known in the prior art, for example from DE 10 2010 016 667 A1 or EP 2 875 762 B1.

The kitchen appliances as well as the stirring vessels and stirrers for them are used in particular in the household sector. To stir or also comminute media introduced into the stirring vessel, in particular food, a stirrer is assigned to a vessel bottom of the stirring vessel, for example in the form of a set of knives comprising a plurality of knives. A stirrer shaft of the stirrer permeates the vessel bottom, in particular to form a coupling carrier, which protrudes freely downwards beyond the vessel bottom. It is further known to connect the stirring vessel to a stirring vessel accommodation of a base unit of the kitchen appliance, on which the stirring vessel stands for example with the help of a pot-like foot part. This foot part can serve to secure the stirrer to the stirring vessel. For cleaning purposes and/or for the purpose of a replacement, the stirrer can be releasably arranged on the stirring vessel. It is further known to provide positioning protrusions, which cooperate with a corresponding opening contour of a bottom opening of the vessel bottom, on a circumferential surface of the stirrer on the vessel bottom so as to prevent rotation.

In the case of the stirring vessels and stirrers, which are known in the prior art, the number of the positioning recesses of the vessel bottom corresponds to the number of the positioning protrusions of the stirrer, wherein, depending on the current model series of the kitchen appliance, a different number of positioning recesses or positioning protrusions, respectively, is provided for safety reasons, so as to prevent the mix-up of components. For a current model of a kitchen appliance, it can be provided for example, that the bottom opening of the stirring vessel has six positioning recesses, into which a stirrer comprising six positioning protrusions can be inserted, according to the model series.

SUMMARY OF THE INVENTION

Based on the above-mentioned prior art, it is now the object of the invention to embody a stirring vessel or a stirrer, respectively, in such a way that, in particular for safety reasons, it is impossible to insert a stirrer of an older model generation into a stirring vessel of a newer model generation, but so that a stirrer of a newer model generation can simultaneously be inserted into a stirring vessel of an old model generation.

To solve the above-mentioned object, a stirring vessel for an electric motor operated kitchen appliance is initially proposed, in the case of which a plurality of first positioning recesses of the opening contour protrude with a first radial length difference beyond a smallest radius of the opening contour, and wherein the opening contour has at least one second positioning recess, which is embodied in the circumferential direction between two first positioning recesses and which protrudes with a second radial length difference beyond the smallest radius of the opening contour, which second radial length difference is smaller than the first radial length difference.

Corresponding to the stirring vessel, which is embodied in this way, the invention furthermore also proposes a stirrer, which has a plurality of positioning protrusions, which are embodied on its circumferential surface one behind the other in the circumferential direction, wherein a plurality of first positioning protrusions of the circumferential surface protrude with a first radial length difference beyond a smallest radius of the circumferential surface, and wherein the circumferential surface has at least one second positioning protrusion, which is embodied in the circumferential direction between two first positioning protrusions, and which protrudes with a second radial length difference beyond the smallest radius of the circumferential surface, which second radial length difference is smaller than the first radial length difference.

By means of the stirring vessel according to the invention or the stirrer according to the invention, respectively, and in particular by means of a combination of these two, it can now be attained that a stirrer of an older model generation, which has more second positioning protrusions than the second positioning recesses allow on the stirring vessel, cannot be inserted into the stirring vessel of the current model generation. It is prevented through this that for example a stirrer, which is not suitable for the speed range of a current model generation of the kitchen appliance, can be used with the current stirring vessel. Provided that a stirrer of the older model generation has for example six positioning protrusions, which have a first radial length difference, and even though the stirring vessel of the current model generation also has six positioning recesses, at least one of which has a second radial length difference, which is smaller than the first radial length difference, it is not possible to insert the stirrer into the stirring vessel. In fact, the user's attention is immediately drawn to the non-existent compatibility of the two model generations in that the stirring vessel cannot be inserted into the bottom opening of the vessel bottom of the stirring vessel.

Conversely, a stirrer of a current model generation for example comprising three long first positioning protrusions and at least one short second positioning protrusion can readily be inserted into a stirring vessel of an older model generation comprising six long first positioning recesses, provided that the positions are identical in the circumferential direction and the widths of the recesses and protrusions correspond. The shapes and sizes of the positioning recesses or positioning protrusions, respectively, remain essentially identical in the case of the older as well as of the new model generation, so that a virtually identical fit of the stirrer inside the stirring vessel results. Due to the fact that the number of the first positioning recesses or first positioning protrusions, respectively, is reduced, in particular halved, the rotational play of the stirrer inside the bottom opening of the stirring vessel also remains identical. Only the possible installation positions of the stirrer, based on the circumferential direction of the stirring vessel, are reduced, for example from six to three, thus for example from a shape correspondence to 60° each to a shape corresponding to 120° each.

According to an alternative embodiment, a stirrer for inserting into a bottom opening of a vessel bottom of a stirring vessel of an electric motor operated kitchen appliance is proposed, wherein the stirrer has a plurality of positioning protrusions, which are embodied on its circumferential surface one behind the other in the circumferential direction, and wherein the stirrer has exactly three positioning protrusions, which are embodied at equidistant distances in the circumferential direction. Analogous thereto, a stirring vessel for an electric motor operated kitchen appliance is furthermore proposed as well, wherein the stirring vessel has a vessel bottom, which has a bottom opening for accommodating a stirrer, which can protrude through the vessel bottom into the stirring vessel, wherein the bottom opening has a plurality of positioning recesses, which are embodied on its opening contour one behind the other in the circumferential direction, namely exactly three positioning recesses, which are embodied at equidistant distances in the circumferential direction. According to this embodiment, the stirring vessel or the stirrer, respectively, only has three positioning recesses or positioning protrusions respectively. It is not provided to additionally also embody shorter second positioning recesses or positioning protrusions respectively, on the stirring vessel or stirrer, respectively. This embodiment is suitable for all situations, in the case of which stirring vessels of earlier equipment generations have a higher number of positioning recesses, of which at least three correspond to the circumferential positions of the positioning protrusions of the current stirrer. This is the case, for example, when a stirring vessel of an earlier generation has a positioning recess every 60°, but the stirrer of a current generation has positioning protrusions only every 120°. Vice versa, a compatibility of an older stirrer in a new stirring vessel would not be possible.

With regard to a stirring vessel or stirrer, respectively, it is furthermore preferably proposed that the vessel bottom has exactly three first positioning recesses and/or that the stirrer has exactly three first positioning protrusions. This embodiment applies with regard to stirring vessels or stirrers, respectively, which only have positioning recesses or protrusions, respectively, of a single radial length difference, as well as with regard to stirring vessels or stirrers, respectively, which have first positioning recesses or first positioning protrusions, respectively, as well as second positioning recesses or second positioning protrusions, respectively.

It is furthermore proposed that the vessel bottom of the stirring vessel has exactly three second positioning recesses or analogously, respectively, that the stirrer has exactly three second positioning protrusions. According to this embodiment, three second positioning recesses or second positioning protrusions, respectively, which have a shorter length difference than the first radial length difference of the first positioning recesses or positioning protrusions, respectively, are available in addition to the first positioning recesses or positioning protrusions, respectively, comprising a first radial length difference. On the one hand, longer positioning recesses or positioning protrusions, respectively, which match stirring vessels or stirrers, respectively, of older and newer equipment generations in a shape-corresponding manner, thus exist on the opening contour of the vessel bottom or the circumferential surface of the stirrer, respectively, and, on the other hand, second positioning recesses or positioning protrusions, respectively, which correspond completely with one another with regard to the recesses and protrusions only in the case of corresponding combination of a stirring vessel and of a stirrer of the same equipment generation, so that no free positioning recess areas exist, which are not completely covered by a positioning protrusion.

It is furthermore proposed that the first radial length difference and the second radial length difference have a length difference of at least 1 mm, preferably of at least 2 mm, to one another. According to this embodiment, the positioning recesses of the stirring vessel or the positioning protrusions of the stirrer, respectively, have different lengths, which differ by at least 1 mm, but preferably by at least 2 mm. It can be provided for example that the opening contour or the circumferential surface, respectively, alternates between having one long and one short positioning recess or one long and one short positioning protrusion, respectively, at equidistant distances. Provided that the number of the long and short positioning recesses or positioning protrusions, respectively, is identical, a possible installation position of the stirrer on the bottom opening results in each case after a long-short recess pair or a long-short protrusion pair, respectively. The length difference of at least 1 mm, preferably at least 2 mm, is thereby sufficient to rule out reliably that a longer positioning protrusion can be pushed into a shorter positioning recess. Even if a user pushes a longer positioning protrusion with force and possibly tilting, respectively, against a shorter positioning recess, the length difference is so large that a shape fit cannot be reached. The user notices this immediately in response to the operation.

It is furthermore proposed that the first radial length difference is larger than 2 mm, preferably larger than 3 mm. This means, in other words, that the first positioning protrusions protrude by more than 2 mm, preferably more than 3 mm, beyond the base area of the stirrer with the smallest radius, or that the first positioning recesses, based on a circular basic contour with a smallest radius, protrude by more than 2 mm, preferably more than 3 mm.

In contrast, it is furthermore proposed that the second radial length difference is smaller than 2 mm. The second positioning protrusions or second positioning recesses, respectively, thus have a length of less than 2 mm, based on the circumferential line of a circle with a smallest radius of the circumferential surface or opening contour, respectively. The second radial length difference can in particular be approximately 1 mm. The short positioning protrusions or positioning recesses, respectively, thus differ only minimally, namely less than 2 mm, in particular 1 mm, from the smallest radius of the circumferential surface of the stirrer or of the opening contour, respectively, of the bottom opening, but, on the other hand, are so long that they contribute to finding a correct installation position of the stirrer in a stirring vessel.

It is furthermore proposed that the smallest radius of the opening contour of the bottom opening of the vessel bottom of the stirring vessel and/or the smallest radius of the circumferential contour of the circumferential surface of the stirrer is between 10 mm and 15 mm. The smallest radius corresponds to a circular basic area of the bottom opening of the stirring vessel or of the circumferential surface of the stirrer, respectively, In the case of an opening contour with a smallest radius of for example 10 mm, a distant end area of a positioning recess with a first radial length difference of for example 3 mm, has a distance of a total of 13 mm to a circle center.

Lastly, a stirring vessel comprising a stirrer is proposed, which is embodied in such a way that a first positioning protrusion, with regard to its shape and size, corresponds to a first positioning recess in such a way that the first positioning protrusion completely fills the first positioning recess, and that a second positioning protrusion, with regard to its shape and size, corresponds to a second positioning recess in such a way that the second positioning protrusion completely fills the second positioning recess. This embodiment describes the optimal case that the stirrer and the stirring vessel are embodied in a shape-corresponding manner with regard to the positioning recesses or positioning protrusions, respectively. This is the case, when the stirrer proposed here and the stirring vessel belong to the same equipment generation of a kitchen appliance. Provided that shape correspondence does not exist, the stirrer cannot be inserted into the stirring vessel. In the case that a stirrer of a current equipment generation is to be inserted into an older stirring vessel, preferably at least a partial shape corresponding with regard to at least the first positioning recesses results, so that the new stirrer can be inserted into the older stirring vessel. The second positioning recesses of the older stirring vessel thereby remain unfilled, possibly at least partially, but whereby a sealing of the stirring vessel or of the bottom opening thereof, respectively, takes place by means of a sealing element and/or a bearing body of the stirrer. A medium accommodated in the stirring vessel, in particular food, can thus not get out of the stirring vessel through the bottom opening.

Lastly, in addition to the above-described stirring vessels and stirrers, an electric motor operated kitchen appliance is also described, which has a base unit, a stirring vessel, which can be connected to the base unit, and a stirrer, which can be inserted into a bottom opening of a vessel bottom of the stirring vessel, wherein the stirring vessel and/or the stirrer is embodied according to one of the above-described embodiments. The further advantages of the electric motor operated kitchen appliance thereby follow as described above with regard to the stirring vessel or the stirrer, respectively.

BRIEF DESCRIPTION OF THE DRAWINGS

The invention will be described in more detail below by means of exemplary embodiments.

FIG. 3 shows an exploded illustration comprising a stirrer, a stirring vessel, and a foot part for the stirring vessel, FIG. 4 shows a stirrer according to the invention, FIG. 5 shows a partial area of a stirrer according to the prior art, FIG. 6 shows a partial area of a stirrer according to the invention according to a second embodiment, and FIG. 7 shows a contour of the partial areas of the stirrers illustrated in FIG. 5 and FIG. 6, as well as an overlapping of them.

DETAILED DESCRIPTION OF THE PREFERRED EMBODIMENTS

Figure 1:
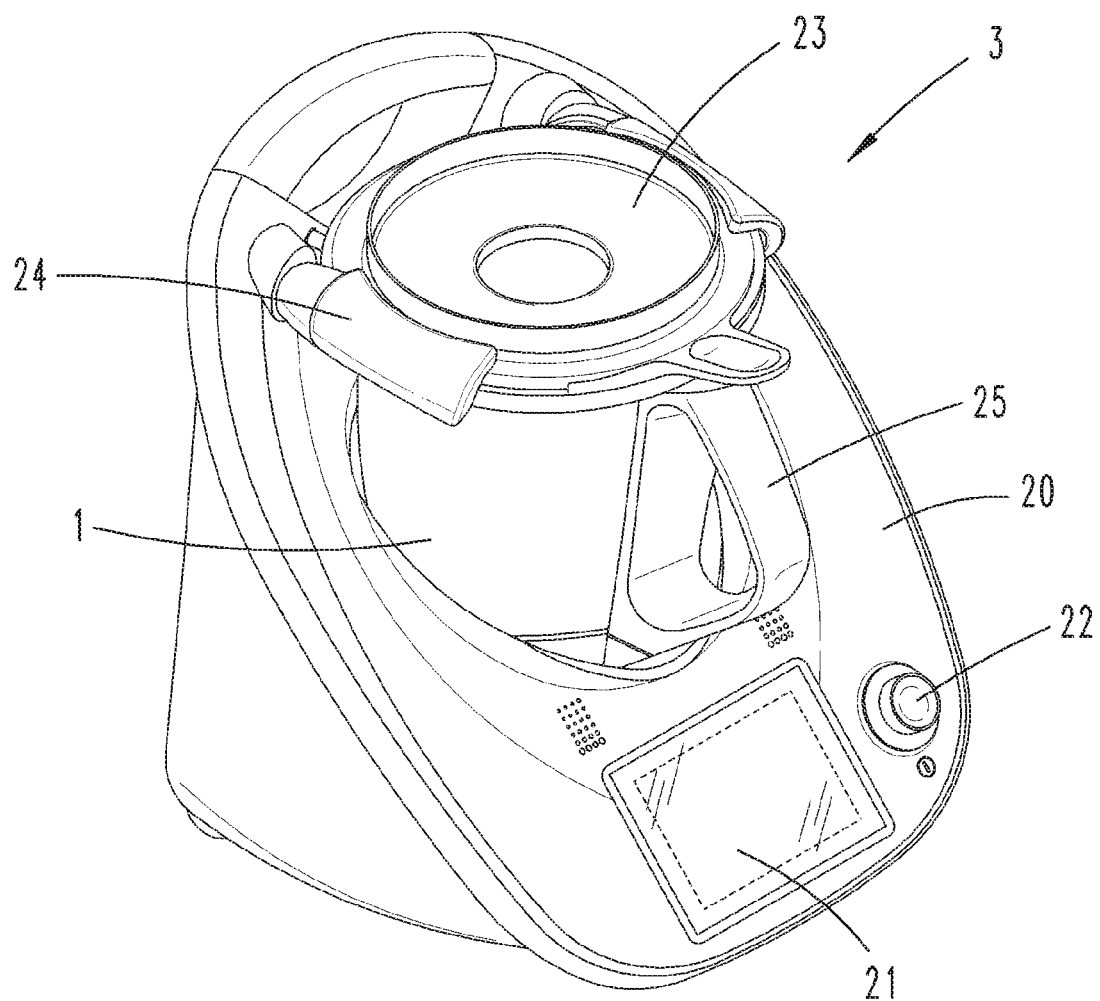
FIG. 1 shows an electric motor operated kitchen appliance comprising a stirring vessel.

FIG. 1 shows a kitchen appliance 3 according to the invention comprising a stirring vessel 1. The kitchen appliance 3 has a base unit 20 comprising a stirring vessel accommodation (not illustrated), into which the stirring vessel 1 is inserted here for example. A stirrer 2, which can be rotated via a non-illustrated electric motor, which is arranged in the base unit 20, is assigned to a vessel bottom 4 of the stirring vessel 1 (see for example FIG. 2). The stirring vessel 1 has for example a handle 25 here, is embodied in a pot-like manner comprising a circular cross section, and supports the stirrer 2, centrally arranged on the vessel bottom 4. An electrical resistance heater can furthermore be assigned to the vessel bottom 4.

The base unit 20 of the kitchen appliance 3, which is proposed in an exemplary manner, furthermore has a display 21 here, on which a drop-down menu, preparation instructions or the like can be displayed. A switch 22, which is embodied here as rotary-push switch, is arranged alongside. The kitchen appliance 3 can for example be turned on and off via this switch or a selection can be made, which is displayed for example on the display 21. The base unit 20 also has two locking elements 24 in the form of locking rollers, which serve to lock the stirring vessel 1 by means of a cover 23.

Figure 2:
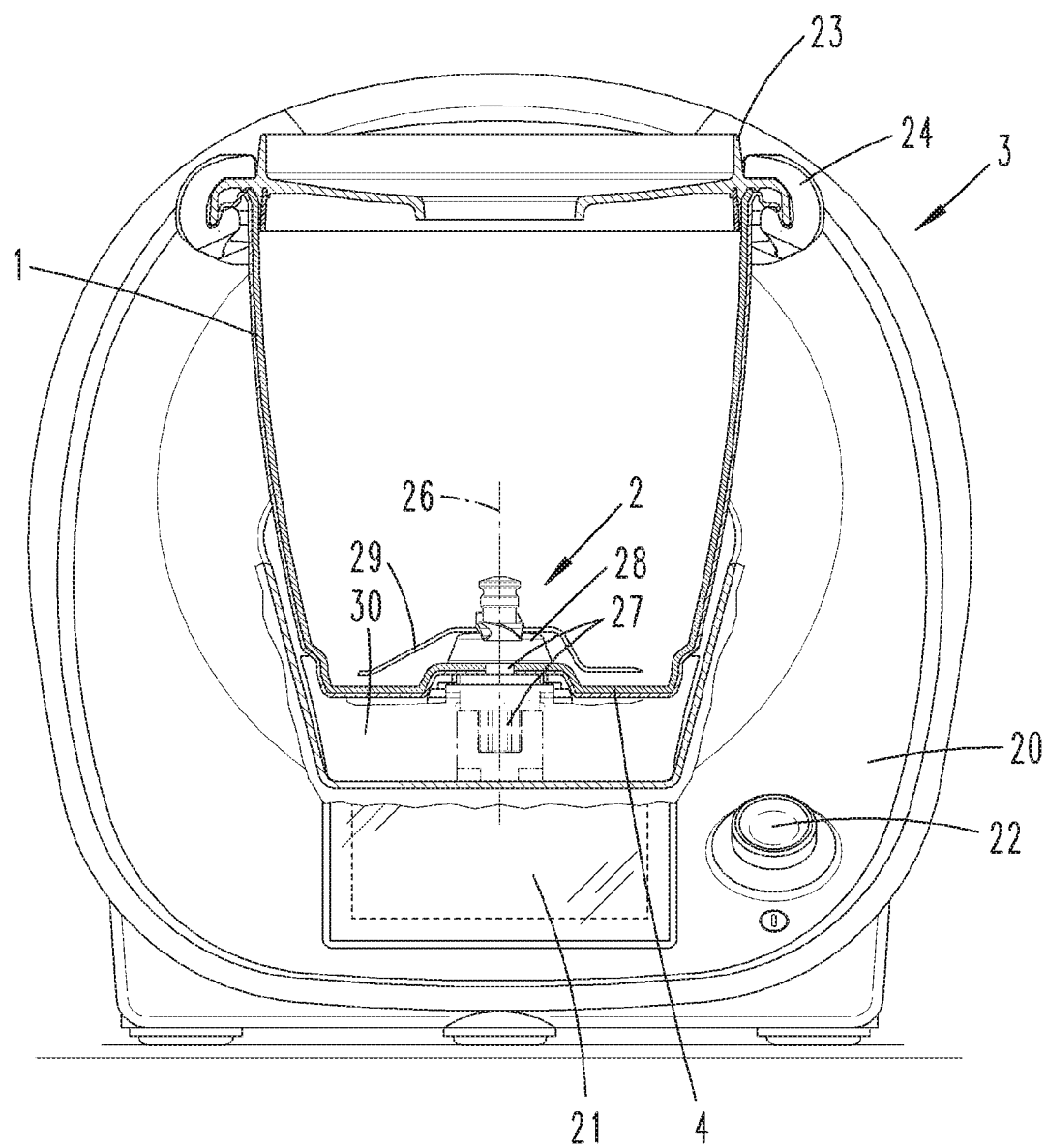
FIG. 2 shows a longitudinal section through the kitchen appliance.

FIG. 2 shows a longitudinal section of the kitchen appliance 3 illustrated in FIG. 1. The stirrer 2 can be seen, which protrudes through the vessel bottom 4 of the stirring vessel 1 into the base unit 20 of the kitchen appliance 3. An electric motor comprising a corresponding drive shaft, to which the stirrer 2 can be coupled, is located in the base unit 20. This is not illustrated in detail in FIG. 2. The stirrer 2 is, for example, a set of knives comprising a plurality of knives 29. The stirrer 2 furthermore has a bearing body 28, which can be arranged on the stirring vessel 1 in a rotationally fixed manner. A stirrer shaft 27, in contrast, is rotationally movable relative to the bearing body 28 and also to the stirring vessel 1, namely rotatable about an axis of rotation 26. The stirrer 2 is furthermore connected to a foot part 30 of the stirring vessel 1, which secures the stirrer 2 to the stirring vessel 1 in a rotationally fixed manner.

FIG. 3 shows a stirring vessel 1 comprising a removed stirrer 2 according to a first embodiment, and a foot part 30 removed from the vessel bottom 4 of the stirring vessel 1. The stirrer 2 is a knife bearing comprising a plurality of knives 29, which are connected to a stirrer shaft 27 in a rotationally fixed manner. The stirrer shaft 27 is rotatably accommodated in a bearing body 28 of the stirrer 2, which bearing body 28 can be guided through a bottom opening 5 of the vessel bottom 4 of the stirring vessel 1, so as to connect it to the vessel bottom 4 in a rotationally fixed manner. A plurality of positioning protrusions 14, 15, 16, which can be guided through corresponding positioning recesses 7, 8, 9 of the bottom opening 5 of the vessel bottom 4, are arranged on the bearing body 28. With regard to its shape and size, every positioning recess 7, 8, 9 corresponds to a positioning protrusion 14, 15, 16. In the illustration, a total of three positioning protrusions 14, 15, 16 or three positioning recesses 7, 8, 9, respectively, are shown. Securing protrusions 31, which serve as counter bearings in response to the securing of the bearing body 28 of the stirrer 2 to the stirring vessel 1, are located on the stirrer 2. Based on a direction parallel to the longitudinal extension of the axis of rotation 26, the securing protrusions 31 are located upstream of one positioning protrusion 14, 15, 16 each, so that, based on an assembly direction of the stirrer 2, the securing protrusions 31 abut on the stirring vessel 1 in the same insertion direction as the assigned positioning protrusion 14, 15, 16, so that one positioning protrusion 14, 15, 16 each, and one securing protrusion 31 are guided through the same positioning recess 7, 8, 9 of the bottom opening 5 of the vessel bottom 4 in response to the assembly.

A plurality of electrical contacts 32 in the form of contact pins, which serve to establish an electroconductive connection to corresponding electrical contacts (not illustrated) of the base unit 20 of the kitchen appliance 3, is furthermore arranged on the vessel bottom 4 of the stirring vessel 1.

The foot part 30 of the stirring vessel 1, which is only proposed in an exemplary manner here, as well as the stirring vessel 1 as a whole, is embodied essentially pot-shaped and serves as accommodation for the vessel bottom 4 of the stirring vessel 1. The foot part 30 provides a base for the stirring vessel 1, so as to be able to place the latter for example onto a worktop, in particular when the vessel bottom 4 is heated up. When the foot part 30 is assembled on the vessel bottom 4, the electrical contacts 32 of the stirring vessel 1 protrude into the interior of the foot part 30. The foot part 30, in turn, can be connected to the stirring vessel accommodation of the base unit 20 of the kitchen appliance 3 in a shape-corresponding manner. The electrical contacts 32 of the stirring vessel 1 thereby come into contact with corresponding electrical contacts of the base unit 20.

The assembly of the foot part 30 to the vessel bottom 4 of the stirring vessel 1 takes place for example in such a way that the foot part 30 is initially positioned on the vessel bottom 4 and is rotated about the axis of rotation 26 of the stirrer 2, which protrudes through the bottom opening 5 of the stirring vessel 1. As a result of the rotation of the foot part 30, a securing element (not illustrated) of the foot part 30 is simultaneously tensioned between the vessel bottom 4 and the securing protrusions 31 of the stirrer 2, so that the stirrer 2 is simultaneously also secured to the stirring vessel 1 as a result of the securing of the foot part 30 to the stirring vessel 1.

FIG. 4 shows, in detail, the stirrer 2 comprising the knives 29, which are connected to the stirrer shaft 27 in a rotationally fixed manner. The stirrer shaft 27 rotates around the axis of rotation 26. A plurality, here a total of three, positioning protrusions 14, 15, 16 (reference numeral 16 is located on the rear side so as not to be visible in the Figure), which serve to engage with corresponding positioning protrusions 14, 15, 16 of the bottom opening 5 of the vessel bottom 4 of the stirring vessel 1, are arranged on the bearing body 28, which can be connected to the vessel bottom 4 in a rotationally fixed manner. In the same radial direction—based on the axis of rotation 26—securing protrusions 31 are arranged below each positioning protrusion 14, 15, 16.

FIGS. 5 and 6 each show a partial area of a bearing body 28 of a stirrer 2, wherein FIG. 5 initially defines the prior art and wherein FIG. 6 shows a second embodiment according to the invention, which differs from the embodiment according to the invention according to FIGS. 3 and 4.

The bearing body 28 of the stirrer 2 according to the prior art illustrated in FIG. 5 has a total of six positioning protrusions 33, of which only four are visible in FIG. 5. A securing protrusion 31 is located above each second positioning protrusion 33. The contour of the circumferential surface 13 illustrated in FIG. 7 on the left on the top, follows based on a cross section of this bearing body 28 perpendicular to the axis of rotation 26 inside a plane, in which the positioning protrusions 33 are embodied. As can be seen, the contour has an initially circular base area with a smallest radius $R_{min}$, as well as positioning protrusions 33 protruding beyond this smallest radius $R_{min}$. The smallest radius $R_{min}$ has here for example a size of 13 mm, while the positioning protrusions 33 protrude from the circular circumferential line by a first radial length difference $\Delta L1$ of for example 4 mm here. All of the positioning protrusions 33 have radial length differences $\Delta L1$, which are identical to one another. The positioning protrusions 33 are furthermore embodied equidistantly one behind the other along the circumferential line of the circular base body. Such a stirrer 2 according to FIG. 5 or FIG. 7, respectively, on the left on the top, serves for fastening to a vessel bottom 4 of a stirring vessel 1 with a corresponding opening contour 6, which has positioning recesses corresponding to the positioning protrusions 33, namely here a total of six positioning recesses, which are also arranged equidistantly to one another and have a shape and size, which corresponds to the positioning protrusions 33.

FIG. 6 or FIG. 7, respectively, on the right on the top, show an embodiment according to the invention of a bearing body 28 of a stirrer 2, which differs from the prior art. The stirrer 2 has for example positioning protrusions 14, 15, 16, 17, 18, 19 here, comprising two different radial length differences $\Delta L_1$, $\Delta L_2$. On the one hand, the circumferential surface 13 of the stirrer 2 has a total of three first positioning protrusions 14, 15, 16, which have a first radial length difference $\Delta L1$. On the other hand, the circumferential surface 13 has three second positioning protrusions 17, 18, 19, which have a second radial length difference $\Delta L_2$. The radial length differences $\Delta L_1$, $\Delta L_2$ are also calculated here again starting at a circumferential line of a circular base body with a smallest radius $R_{min}$. The smallest radius $R_{min}$ is here also approximately 13 mm, analogous to FIG. 5. The first radial length difference $\Delta L_1$ of the first positioning protrusions 14, 15, 16 corresponds to the first radial length difference $\Delta L_1$ of the positioning protrusions 33 according to the prior art, as illustrated in FIG. 5. The second positioning protrusions 17, 18, 19, in contrast, have a smaller, second radial length difference $\Delta L_2$, which is only approximately 1.5 mm here. The first positioning protrusions 14, 15, 16 and the second positioning protrusions 17, 18, 19 are each arranged equidistantly to one another, wherein a first positioning protrusions 14, 15, 16 is in each case located between two second positioning protrusions 17, 18, 19 each along the circumferential line, or a second positioning protrusion 17, 18, 19 is in each case located between two first positioning protrusions 14, 15, 16 each, respectively. The contour of the circumferential surface 13 of the bearing body 28 according to FIG. 6, which is illustrated in FIG. 7 on the right on the top, results. The three first positioning protrusions 14, 15, 16 are in each case spaced apart at angular distances of 120° to one another. The second positioning protrusions 17, 18, 19 are also spaced apart relative to one another at an angular range of 120°. Angular sections of 60° in each case exist between a first positioning protrusion 14, 15, 16 and an adjacent second positioning protrusion 17, 18, 19.

In comparison, the contours according to the prior art illustrated in FIG. 5 and the embodiment according to the invention illustrated in FIG. 7 differ, such as in the covering shown in FIG. 7 on the bottom. In particular, areas, which differ from one another, exist along the contour. These are the angular areas, in which the bearing body 28 of the embodiment illustrated in FIG. 6 has shortened second positioning protrusions 17, 18, 19, which have a second radial length difference $\Delta L_2$, which is smaller than the first radial length difference $\Delta L_1$ of the positioning protrusions 33 or of the first positioning protrusions 14, 15, 16, respectively.

The circumferential contours of the bearing body 28 illustrated in FIG. 7 simultaneously correspond to an opening contour 6 of a bottom opening 5 of a shape-corresponding vessel bottom 4. The positioning protrusions 14, 15, 16, 17, 18, 19 illustrated in FIG. 7 on the right are thus simultaneously also numbered as positioning recesses 7, 8, 9, 10, 11, 12.

As can be seen from FIG. 7, the embodiment of the stirrer 2 according to the invention has the result that the stirrer 2 illustrated in FIG. 6 can be introduced into a corresponding bottom opening 5 according to the embodiment illustrated in FIG. 7 on the left as well as according to the embodiment illustrated according to FIG. 7 on the right, but that, vice versa, the stirrer 2 according to FIG. 5, which is known from the prior art, cannot be introduced into a bottom opening 5, the opening contour 6 of which corresponds to the embodiment shown in FIG. 7 on the right. As illustrated on the bottom in FIG. 7, the positioning protrusions 33 are too long to be capable of being inserted into the second positioning recess 10, 11, 12 of the vessel bottom 4. The stirrer 2 according to FIG. 5, which is known from the prior art, can thus not be inserted into a stirring vessel 1, which requires a stirrer 2 according to FIG. 6. In contrast, however, the stirrer 2 according to FIG. 6 can be inserted into a stirring vessel 1, which is embodied for the prior art according to FIG. 5, wherein the second positioning protrusions 17, 18, 19 of the bearing body 28 then do not completely cover the positioning recesses formed in the vessel bottom 4. However, the bearing body 28 as well as possibly an additional sealing element then ensures a complete sealing of the stirrer 2 against the stirring vessel 1, so that medium can also not escape in this case out of the stirring vessel 1 through the bottom opening 5. Even though the stirrers 2 according to the embodiments in FIG. 3 or 4 and 6, respectively, are compatible with stirring vessels 1 of the prior art, a stirring vessel 2 illustrated in FIG. 5 is vice versa not compatible with the stirring vessels 1 according to the invention.

LIST OF REFERENCE NUMERALS 1 stirring vessel
2 stirrer
3 kitchen appliance
4 vessel bottom
5 bottom opening
6 opening contour
7 first positioning recess
8 first positioning recess
9 first positioning recess
10 second positioning recess
11 second positioning recess
12 second positioning recess
13 circumferential surface
14 first positioning protrusion
15 first positioning protrusion
16 first positioning protrusion
17 second positioning protrusion
18 second positioning protrusion
19 second positioning protrusion
20 base unit
21 display
22 switch
23 cover
24 locking element
25 handle
26 axis of rotation
27 stirring shaft
28 bearing body
29 knife
30 foot part
31 securing protrusion
32 electrical contact
33 positioning protrusion
$\Delta L_1$ first radial length difference
$\Delta L_2$ second radial length difference
$R_{min}$ smallest radius

What is claimed is:

1. A stirring vessel for an electric motor operated kitchen appliance,
the stirring vessel having a vessel bottom with a bottom opening for accommodating a stirrer that can protrude through the vessel bottom into the stirring vessel,
wherein an opening contour of the bottom opening has a plurality of positioning recesses embodied one behind the other in a circumferential direction,
wherein a plurality of first positioning recesses of the opening contour protrude with a first radial length difference ($\Delta L_1$) beyond a smallest radius ($R_{min}$) of the opening contour, and
wherein the opening contour has a plurality of second positioning recesses, wherein the number of the first positioning recesses and the number of the second positioning recesses is identical, and wherein each second positioning recess is embodied in the circumferential direction between two of the first positioning recesses and which protrudes with a second radial length difference ($\Delta L_2$) beyond the smallest radius ($R_{min}$) of the opening contour, which second radial length difference ($\Delta L_2$) is smaller than the first radial length difference ($\Delta L_1$), and wherein the second radial length difference ($\Delta L_2$) is smaller than 2 mm, so that the second radial length difference ($\Delta L_2$) differs only minimally from the smallest radius ($R_{min}$) of the opening contour, but is sufficiently long so as to assist finding a correct installation position of the stirrer in the stirring vessel.

2. The stirring vessel according to claim 1, wherein the vessel bottom has exactly three first positioning recesses.

3. The stirring vessel according claim 1, wherein the first radial length difference ($\Delta L_1$) and the second radial length difference ($\Delta L_2$) differ by at least 1 mm relative to one another.

4. The stirring vessel according to claim 1, wherein the first radial length difference ($\Delta L_1$) is larger than 2 mm.

5. The stirring vessel according to claim 1, wherein the radius ($R_{min}$) of the opening contour of the bottom opening of the vessel bottom of the stirring vessel is between 10 mm and 15 mm.

6. The stirring vessel according to claim 1, further comprising a stirrer having a plurality of positioning protrusions embodied on a circumferential surface of the stirrer one behind the other in a circumferential direction, wherein a plurality of first positioning protrusions of the circumferential surface protrude with a first radial length difference ($\Delta L_1$) beyond a smallest radius ($R_{min}$) of the circumferential surface, and wherein the circumferential surface has at least one second positioning protrusion, which is embodied in the circumferential direction between two of the first positioning protrusions, and wherein the at least one second positioning protrusion protrudes with a second radial length difference ($\Delta L_2$) beyond the smallest radius ($R_{min}$) of the circumferential surface, which second radial length difference ($\Delta L_2$) is smaller than the first radial length difference ($\Delta L_1$), wherein the first positioning protrusion corresponds to the first positioning recess in such a way that the first positioning protrusion completely fills the first positioning recess, and wherein the second positioning protrusion corresponds to the second positioning recess in such a way that the second positioning protrusion completely fills the second positioning recess.

7. An electric motor operated kitchen appliance comprising:
- a base unit,
- a stirring vessel according to claim 1, the stirring vessel being configured to be connected to the base unit, and
- a stirrer that is configured to be inserted into the bottom opening of the vessel bottom of the stirring vessel.

* * * * *